(12) United States Patent
Igarashi

(10) Patent No.: US 9,917,964 B2
(45) Date of Patent: Mar. 13, 2018

(54) INFORMATION PROCESSING APPARATUS, INFORMATION SYSTEM, INFORMATION PROCESSING METHOD, AND STORAGE MEDIUM

(71) Applicant: CANON KABUSHIKI KAISHA, Tokyo (JP)

(72) Inventor: Hiroya Igarashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/378,234

(22) Filed: Dec. 14, 2016

(65) Prior Publication Data

US 2017/0187889 A1 Jun. 29, 2017

(30) Foreign Application Priority Data

Dec. 28, 2015 (JP) .................. 2015-256752

(51) Int. Cl.
*G06F 3/12* (2006.01)
*H04N 1/00* (2006.01)
*H04N 1/32* (2006.01)

(52) U.S. Cl.
CPC ........... *H04N 1/0048* (2013.01); *G06F 3/121* (2013.01); *G06F 3/1229* (2013.01); *G06F 3/1234* (2013.01); *G06F 3/1285* (2013.01); *H04N 1/0097* (2013.01); *H04N 1/00244* (2013.01); *H04N 1/00464* (2013.01); *H04N 1/32625* (2013.01); *H04N 1/32657* (2013.01); *H04N 1/32667* (2013.01)

(58) Field of Classification Search
None
See application file for complete search history.

(56) References Cited

U.S. PATENT DOCUMENTS

| 7,190,481 | B2 * | 3/2007 | Hirabayashi | ........ G06F 17/3089 358/1.18 |
| 7,325,045 | B1 | 1/2008 | Manber et al. | |
| 8,447,973 | B2 * | 5/2013 | Ohara | ................ H04N 1/00204 709/203 |

(Continued)

FOREIGN PATENT DOCUMENTS

JP 2011-119939 A 6/2011

OTHER PUBLICATIONS

European Search Report issued in corresponding EP Application No. 16002530.0 dated May 3, 2017.

*Primary Examiner* — Dung Tran
(74) *Attorney, Agent, or Firm* — Fitzpatrick, Cella, Harper & Scinto

(57) ABSTRACT

It is possible to notify a user of a condition of a Web server in the case where Web contents cannot be acquired from the Web server in an apparatus that employs a Web UI. A request for Web contents is made to a server by using a first communication method, a screen based on the Web contents received as a response to the request is displayed on a display unit, a condition of the server is acquired from the server by using a second communication method different from the first communication method, and a screen based on the condition of the server acquired by using the second communication method is displayed on the display unit without displaying a screen indicating an error of the request on the display unit in the case where the Web contents cannot be acquired as a response to the request.

12 Claims, 10 Drawing Sheets

(56) References Cited

U.S. PATENT DOCUMENTS

| | | | |
|---|---|---|---|
| 8,947,699 B2 | 2/2015 | Ito | 358/1.15 |
| 2004/0143651 A1* | 7/2004 | Allen | H04L 29/06 |
| | | | 709/221 |
| 2009/0273798 A1* | 11/2009 | Igarashi | G03G 15/50 |
| | | | 358/1.9 |
| 2011/0208809 A1* | 8/2011 | Ito | H04N 1/00222 |
| | | | 709/203 |
| 2011/0235103 A1* | 9/2011 | Ito | H04N 1/00464 |
| | | | 358/1.15 |
| 2012/0081730 A1* | 4/2012 | Ito | H04N 1/00244 |
| | | | 358/1.13 |
| 2016/0323288 A1* | 11/2016 | Peterson | H04L 63/102 |

* cited by examiner

INFORMATION PROCESSING APPARATUS, INFORMATION SYSTEM, INFORMATION PROCESSING METHOD, AND STORAGE MEDIUM

BACKGROUND OF THE INVENTION

Field of the Invention

The present invention relates to an information processing apparatus that provides a Web user interface to a user, an information system, an information processing method, and a storage medium.

Description of the Related Art

In recent years, a Web user interface (UI) making use of a Web browser has begun to be made use of as a user interface. For example, in an image forming apparatus that forms an image on a printing medium also, the Web UI is employed. An apparatus employing the Web UI displays a UI screen on the Web browser by using Web contents acquired from an apparatus including a Web server function (hereinafter, simply referred to as Web server).

Japanese Patent Laid-Open No. 2011-119939 has described an apparatus that displays an alternative UI screen included inside the apparatus on the Web browser in order to enable the work in the off-line condition in the case where it is not possible to correctly communicate with the Web server.

As described above, in the apparatus employing the Web UI, in the case where Web contents cannot be acquired from the Web server, only the alternative UI screen is displayed on the Web browser, and a user is not notified of the condition of the Web server.

The present invention has been made in view of such a problem and provides an information processing apparatus capable of notifying a user of the condition of the Web server also even in the case where Web contents cannot be acquired from the Web server in an apparatus employing the Web UI, an information system, an information processing method, and a storage medium.

SUMMARY OF THE INVENTION

An information processing apparatus according to the present invention includes: a memory device that stores a set of instructions; and at least one processor that executes the instructions to:

request Web contents from a server by using a first communication method;

display a screen based on the Web contents received as a response to the request on a display unit;

acquire a condition of the server from the server by using a second communication method different from the first communication method; and display a screen based on the condition of the server acquired by using the second communication method on the display unit without displaying a screen indicating an error of the request on the display unit in a case where the Web contents cannot be acquired as a response to the request.

Further features of the present invention will become apparent from the following description of exemplary embodiments (with reference to the attached drawings).

DESCRIPTION OF THE EMBODIMENTS

In the following, with reference to the drawings, embodiments for embodying the present invention are explained. The configurations shown in the following are merely exemplary and the present invention is not limited to the configurations shown schematically.

[First Embodiment]

Figure 1:
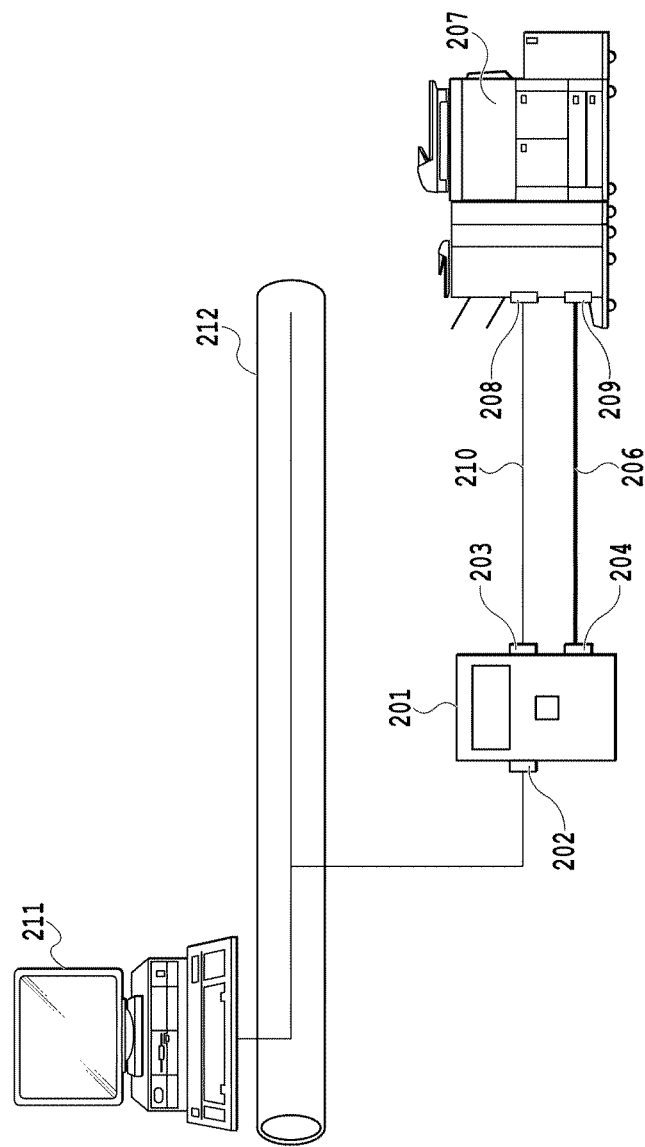
FIG. 1 is an explanatory diagram showing an example of a configuration of an information system according to a first embodiment.

FIG. 1 is an explanatory diagram showing an example of a configuration of an information system according to a first embodiment. In FIG. 1, as an information system, an image processing system including a print control apparatus 201 that is an information processing server and an image forming apparatus 207 that is an information processing apparatus is shown.

The image forming apparatus 207 acquires Web contents from the print control apparatus 201 via a LAN (Local Area Network) 210 and provides a Web user interface (Web UI) to a user by using the acquired Web contents. The image forming apparatus 207 notifies the print control apparatus 201 of user instructions input via the Web UI.

The print control apparatus 201 has a Web server function. The print control apparatus 201 performs various kinds of processing based on the user instructions notified by the image forming apparatus 207.

A terminal apparatus 211 is a terminal capable of communicating with the print control apparatus 201 and is, for example, a personal computer (PC). The terminal apparatus 211 transmits print data to the print control apparatus 201 via a LAN 212.

In FIG. 1, one terminal apparatus is illustrated, but a plurality of terminal apparatuses may be connected to the print control apparatus 201. Further, in FIG. 1, one image forming apparatus is illustrated, but a plurality of image forming apparatuses may be connected to the print control apparatus 201. Furthermore, the information system may be made up of an information processing server other than the print control apparatus and an information processing apparatus other than the image forming apparatus. For example, the information system may be made up of a mobile terminal (e.g., smartphone) employing the Web UI and an information processing server that provides Web contents to the mobile terminal.

Figure 2:
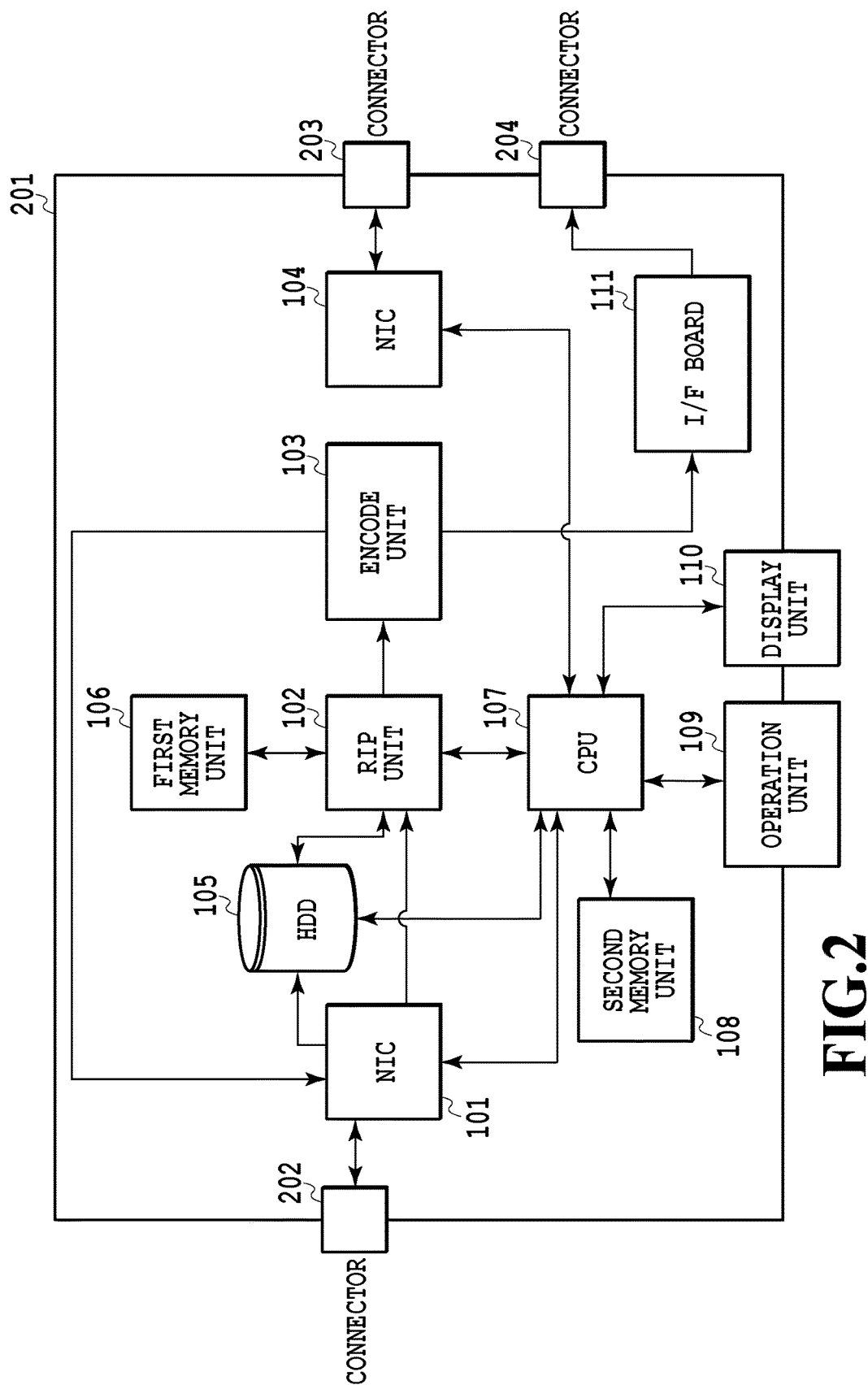
FIG. 2 is a block diagram showing an example of a configuration of a print control apparatus according to the first embodiment.

First, by using FIG. 2, the print control apparatus 201 is explained.

FIG. 2 is a block diagram showing an example of a configuration of the print control apparatus 201 according to the first embodiment.

A connector 202 connects the print control apparatus 201 and the LAN 212. A connector 203 connects the print control apparatus 201 and the LAN 210. A connector 204 connects the print control apparatus 201 and a dedicated circuit line 206.

An NIC (Network Interface Card) 101 governs the low-layer level connection to the LAN 212.

An RIP (Raster Image Processor) unit 102 converts data described in a print language, such as a PDL (Page Description Language), received by the NIC 101 and data compressed in a specific data format (e.g., JBIG (Joint Bi-level Image Experts Group) into a raster image.

An encode unit 103 functions as a data format conversion unit. In the present embodiment, the encode unit 103 converts data converted into a raster image into a data format supported by the image forming apparatus 207.

An NIC 104 governs the low-layer level connection to LAN 210.

A hard disk drive (HDD) 105 temporarily saves (spools) data received by the NIC 101. The HDD 105 temporarily saves compressed data after the RIP.

A first memory unit 106 is a memory that is made use of by the RIP unit 102 in image development processing.

A CPU 107 governs control of the whole of the print control apparatus 201.

A second memory unit 108 is a memory that is made use of by the CPU 107 as a data temporary saving area.

An operation unit 109 has a button, a key, a touch panel, etc. A user performs an operation of the print control apparatus 201 via the operation unit 109.

A display unit 110 is, for example, a liquid crystal display and reports information to an operator by displaying an image or a character.

An interface (I/F) board 111 is an image interface board. The I/F board 111 is connected with the connector 204. Image data is transferred to the image forming apparatus 207 via the I/F board 111 and the connector 204 and through a dedicated transfer path (dedicated circuit line 206).

Here, a flow of a data packet that is transmitted from the terminal apparatus 211 is explained.

A data packet that is transmitted from the terminal apparatus 211 to the print control apparatus 201 is propagated via the LAN 212 and is taken in by the print control apparatus 201 via the connector 202. Then, in the NIC 101, the reception processing of the data packet is performed. In the case where the NIC 101 receives data packet including print data, the CPU 107 queues (spools) the print data in the HDD 105 in accordance with the necessity in order to increase the data transfer rate. The print data queued in the HDD 105 is read from the RIP unit 102 in accordance with instructions of the CPU 107. On the other hand, print data not queued is transferred directly to the RIP unit 102 in accordance with instructions of the CPU 107.

The print data sent to the RIP unit 102 is converted into a raster image in the RIP unit 102. At the time of converting the print data into a raster image, the RIP unit 102 also determines whether or not the image forming apparatus 207 can perform printing in the set order.

The encode unit 103 performs the encode processing of the print data into a data format that can be interpreted by the image forming apparatus 207 based on the data format that can be interpreted by the image forming apparatus 207 and the format of the received print data, which are set in advance. In the case where the received print data is the data format that can be interpreted by the image forming apparatus 207, the encode unit 103 skips the encode processing. That is, the encode processing is performed in accordance with the necessity. The format of the print data after the encode processing is determined to be, for example, a specific print language format or a data format compressed by the JBIG or the like in accordance with the ability of an interpretation unit built in the image forming apparatus 207.

The data thus encoded is converted into a data packet again by the NIC 104 for being sent out to the LAN 210. The data converted in to a data packet is sent out from the connector 203 for each print job and is sent to the image forming apparatus 207 via the LAN 210 and the connector 208.

The image forming apparatus 207 having received the data packet performs printing processing to output image data included in the data packet on a printing medium, such as paper, in accordance with the printing processing procedure set in advance.

It may also be possible for the encode unit 103 to transfer the encoded data to the I/F board 111 and for the I/F board 111 to send out the data to the dedicated circuit line 206 via the connector 204. The data sent out via the dedicated circuit line 206 is taken in by the image forming apparatus 207 via the connector 209.

Figure 3:
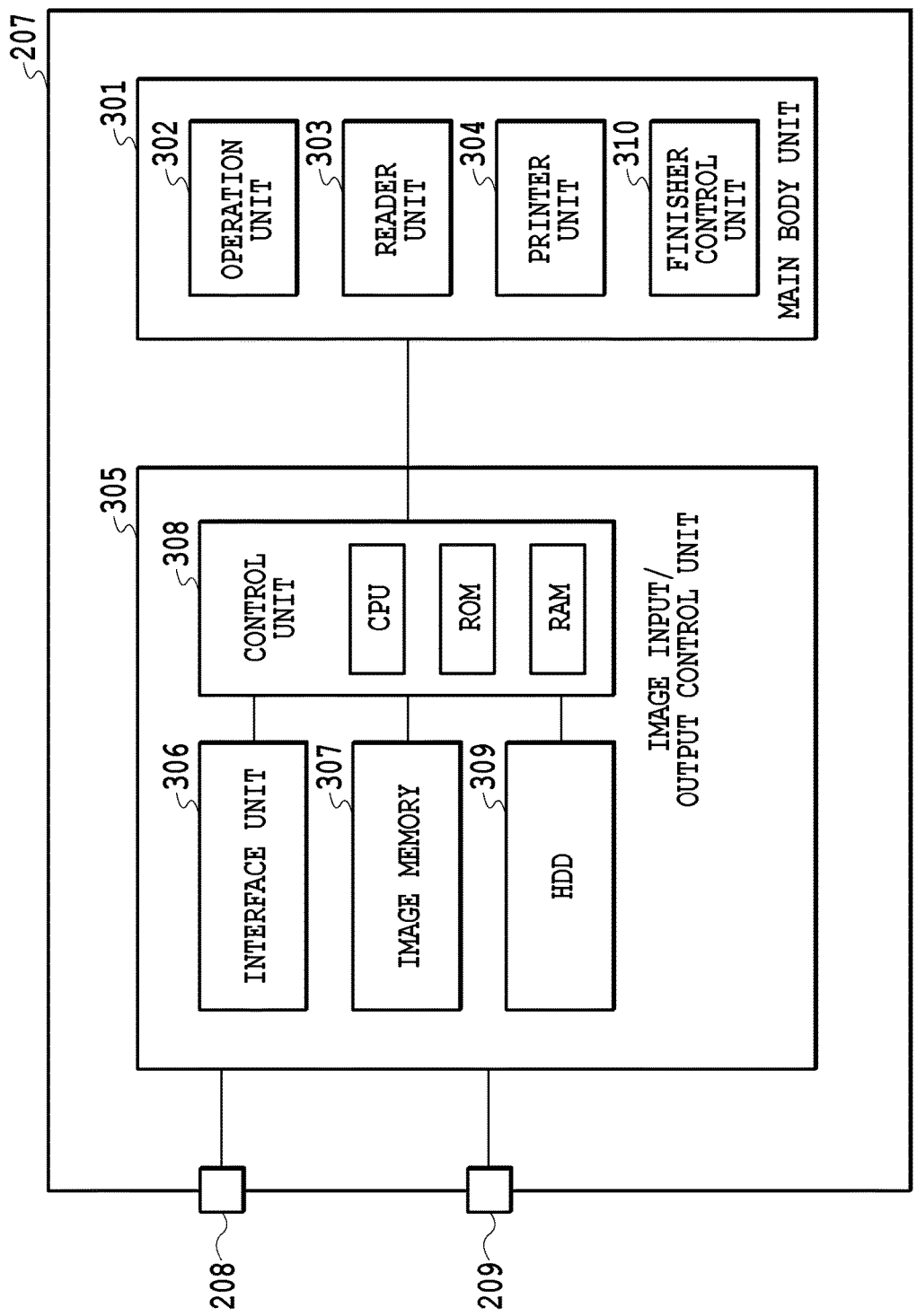
FIG. 3 is a block diagram showing an example of a configuration of an image forming apparatus according to the first embodiment.

Next, by using FIG. 3, the image forming apparatus 207 is explained.

FIG. 3 is a block diagram showing an example of a configuration of the image forming apparatus 207 according to the first embodiment. As shown in FIG. 3, the image forming apparatus 207 of the present embodiment includes a main body unit 301 and an image input/output control unit 305.

The main body unit 301 has an operation unit 302, a reader unit 303, a printer unit 304, and a finisher control unit 310.

The operation unit 302 controls an operation panel (operation panel 401 shown in FIG. 4), to be described later. The reader unit 303 reads the image of a document and outputs image data corresponding to the document to the printer unit 304 and the image input/output control unit 305. The printer unit 304 prints an image corresponding to the image data input from the reader unit 303 or the image input/output control unit 305 on a printing medium, such as paper. The finisher control unit 310 controls a post processing apparatus that performs post processing (e.g., sort processing) of the printing medium on which the image is printed by the printer unit 304.

The image input/output control unit 305 is connected with the reader unit 303 of the main body unit 301. The image input/output control unit 305 has an interface unit 306, an image memory 307, a control unit 308, and a hard disk (HDD) 309.

The hard disk (HDD) 309 stores information indicating the settings (e.g., address book, operation history, user setting, ID setting, network setting) of the image forming apparatus 207.

The interface unit 306 connects the print control apparatus 201 and the terminal apparatus 211 on the LAN 212 with the control unit 308. The interface unit 306 receives code data representing an image transmitted from the print control apparatus 201 via the dedicated circuit line 206 at a connector 209. The interface unit 306 develops the data received at the connector 209 into image data that can be printed by the printer unit 304 and delivers the image data to the control unit 308. Further, the interface unit 306 receives code data representing an image transmitted from the print control apparatus 201 via the LAN 210 at a network interface (connector 208), such as the Ethernet (registered trademark). In the case where it is necessary to develop the data received at the connector 208 into image data that can be printed by the printer unit 304, the interface unit 306 develops the data and delivers the data to the control unit 308. The connector 209 may be a network interface. That is, the connector 209 may have a configuration that is connected with the print control apparatus 201 via a network in place of the dedicated circuit line 206. Further, the connector 209 may be an interface, such as a parallel interface and a USB interface, and may have a configuration that is connected directly with the print control apparatus 201 via an interface cable or the like. Furthermore, the connector 209 and the print control apparatus 201 may be connected by a plurality of cables in place of one cable.

The control unit 308 includes a CPU, a ROM, a RAM, etc., and each unit is controlled by the CPU loading a program stored in the ROM or another storage medium onto the RAM and executing the program. For example, the control unit 308 controls the data flow between the reader unit 303, the interface unit 306, the image memory 307, etc. Further, for example, the control unit 308 controls the printer unit 304 and the finisher control unit 310 while determining whether printing processing and post processing can be performed in the order of the data sent from the interface unit 306.

In the image forming apparatus 207 of the present embodiment, it is assumed that one CPU performs each piece of processing shown in a flowchart, to be described later, by using one RAM, but another aspect may be accepted. For example, it is possible to perform each piece of processing shown in the flowchart, to be described later, by causing a plurality of CPUs, RAMS, ROMs, and storages to cooperate.

The image input/output control unit 305 may have another nonvolatile memory in place of the HDD 309.

Figure 4:
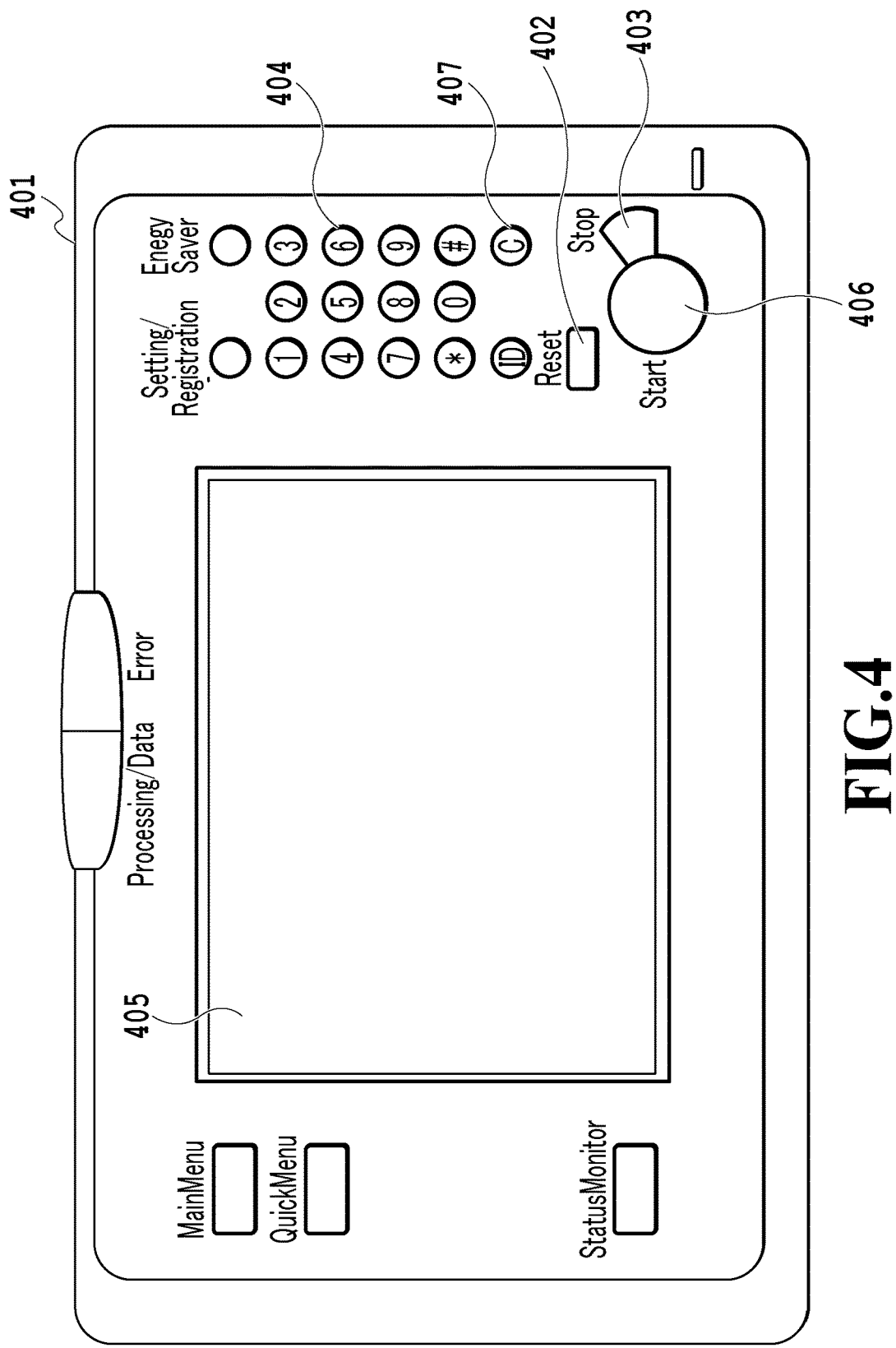
FIG. 4 is an explanatory diagram showing an example of an operation panel included in the image forming apparatus according to the first embodiment.

FIG. 4 is an explanatory diagram showing an example of an operation panel 401 included in the image forming apparatus 207 according to the first embodiment. A button 402 is a Reset key for cancelling a setting value or the like that is set by a user. A button 403 is a Stop key that a user uses at the time of suspending a job in operation. A button 404 is a ten key for inputting a numerical value, such as a register number. An operation screen 405 is a touch panel operation screen. A button 406 is a Start key for starting to read a document and so on. A button 407 is a clear key for clearing settings or the like. Besides the above, in the example shown in FIG. 4, an initial Setting/Registration button, a button for making a transition into an energy-saving mode, a button for displaying a main menu (Main-Menu button), a button for displaying a quick menu (Quick-Menu button) capable of making up a customized screen for each user, and a button for displaying a condition of the device (StatusMonitor button) are arranged as hard keys.

Figure 5:
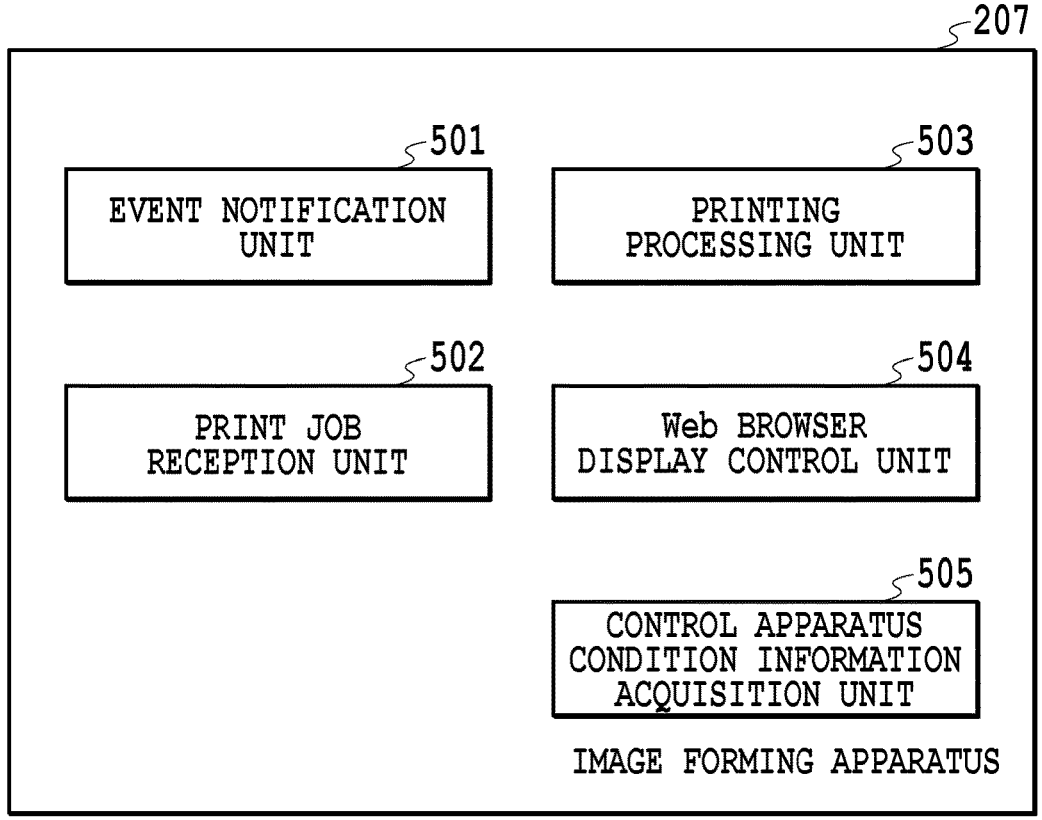
FIG. 5 is a block diagram showing an example of a software configuration of the image forming apparatus according to the first embodiment.

FIG. 5 is a block diagram showing an example of a software configuration of the image forming apparatus 207 according to the first embodiment. In the present embodiment, on the ROM or RAM shown in FIG. 3, programs for controlling each unit shown in FIG. 5 are stored and each unit shown in FIG. 5 functions by the CPU shown in FIG. 3 loading and executing the programs.

An event notification unit 501 notifies the print control apparatus 201 of various conditions of the image forming apparatus 207, such as completion of a job and paper out.

A print job reception unit 502 receives a print job from the print control apparatus 201.

A printing processing unit 503 controls printing processing of a print job received by the print job reception unit 502.

A Web browser display control unit 504 displays a user interface provided by the print control apparatus 201 on the operation panel 401. Specifically, the Web browser display control unit 504 acquires Web contents from a Web server unit 605, to be described later, of the print control apparatus 201 by using a first communication protocol. Then, the Web browser display control unit 504 displays a user interface on the operation panel 401 by using the acquired Web contents.

A control apparatus condition information acquisition unit 505 performs monitoring processing of the operating condition of the print control apparatus 201. For example, the control apparatus condition information acquisition unit 505 periodically or intermittently acquires the condition information indicating the condition of the print control apparatus 201 from the print control apparatus 201 by using a second communication protocol different from the first communication protocol. Further, for example, the control apparatus condition information acquisition unit 505 receives the condition information that is notified by the print control apparatus 201. As the operating condition of the print control apparatus 201, besides the normal condition, the restarting condition, the power source-off condition, the starting condition, the condition where the Web server function is suspended (hereinafter, referred to as Web server function suspended condition), etc., are considered. The control apparatus condition information acquisition unit 505 holds the acquired or received condition information. For example, the control apparatus condition information acquisition unit 505 stores the condition information in the storage medium (e.g., the RAM included in the control unit 308).

Figure 6:
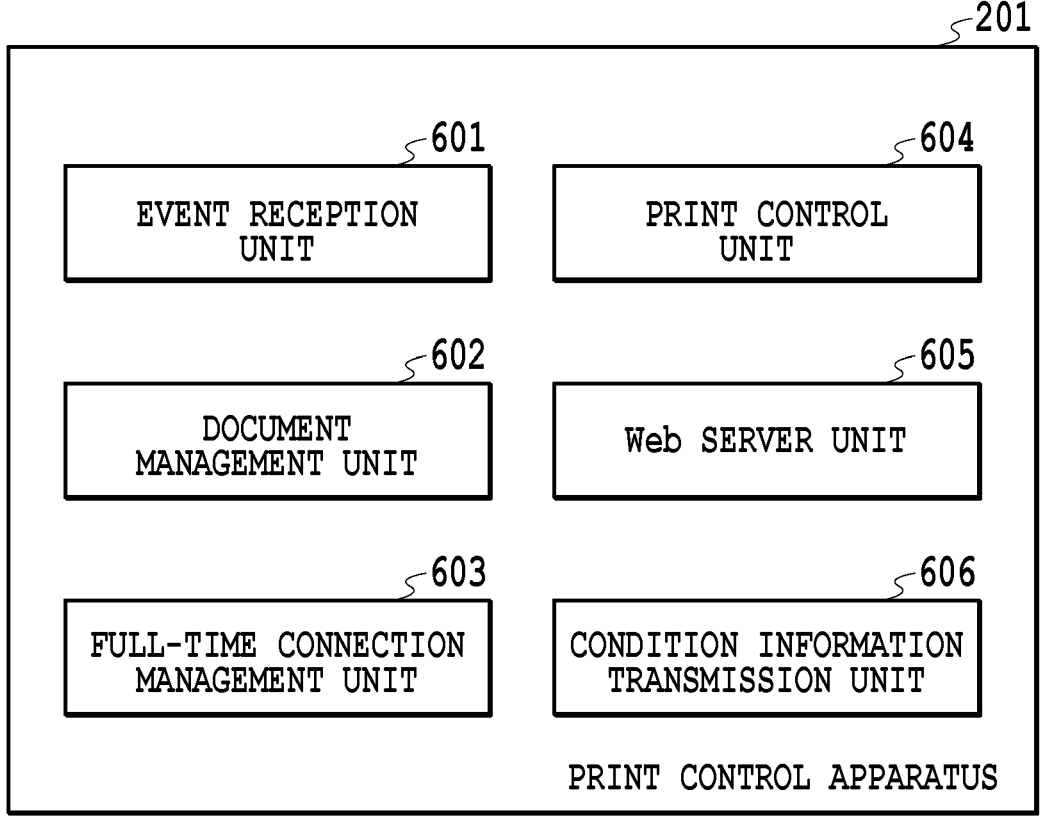
FIG. 6 is a block diagram showing an example of a software configuration of the print control apparatus according to the first embodiment.

FIG. 6 a block diagram showing an example of a software configuration of the print control apparatus 201 according to the first embodiment. In the present embodiment, on the ROM (diagrammatic representation omitted) or the RAM (diagrammatic representation omitted) of the print control apparatus 201, the programs for controlling each unit shown in FIG. 6 are stored and each unit shown in FIG. 6 functions by the CPUT 107 loading and executing the programs.

An event reception unit 601 receives a notification of the condition of a print job from the image forming apparatus 207.

A document management unit 602 manages document information of each user.

A full-time connection management unit 603 manages the condition of communication with the image forming apparatus 207.

A print control unit 604 generates a print job suitable to the image forming apparatus specified by printing instructions. The print control unit 604 transmits the generated print job to the image forming apparatus specified by printing instructions.

The Web server unit (also referred to as Web contents transmission unit) 605 includes a Web server function. The Web server unit 605 provides the terminal device 211 with a user interface for inputting a document, which uses the HTTP (HyperText Transfer Protocol) protocol. Similarly, the Web server unit 605 provides the image forming apparatus 207 with a user interface (UI screen 802, to be described later) using the HTTP protocol.

A condition information transmission unit 606 notifies the image forming apparatus 207 of the condition (e.g., power-off, restarting) of the print control apparatus 201. Specifically, the condition information transmission unit 606 transmits condition information indicating the condition of the print control apparatus 201 to the image forming apparatus 207. As described above, in the present embodiment, the condition information transmission unit 606 other than the Web server unit 605 notifies the image forming apparatus 207 of the condition of the print control apparatus 201. Consequently, for example, even in the case where the Web server unit 605 is suspended due to an error or the like, it is possible for the condition information transmission unit 606 to notify the control apparatus condition information acquisition unit 505 of the condition of the print control apparatus 201. The condition information transmission unit 606 notifies the control apparatus condition information acquisition unit 505 of the condition of the print control apparatus 201 at the timing of the change in the condition of the print control apparatus 201 or the timing of reception of a notification request from the image forming apparatus 207. For example, in the case where the Web server unit 605 is suspended due to an error, the condition information transmission unit 606 transmits condition information indicating the Web server function suspended condition. Further, for example, upon receipt of instructions to restart the print control apparatus 201, the condition information transmission unit 606 transmits condition information indicating that the print control apparatus 201 is restarting. In the present embodiment, the condition information transmission unit 606 and the control apparatus condition information acquisition unit 505 of the image forming apparatus 207 perform communication by using another communication protocol different from the HTTP.

Figure 7:
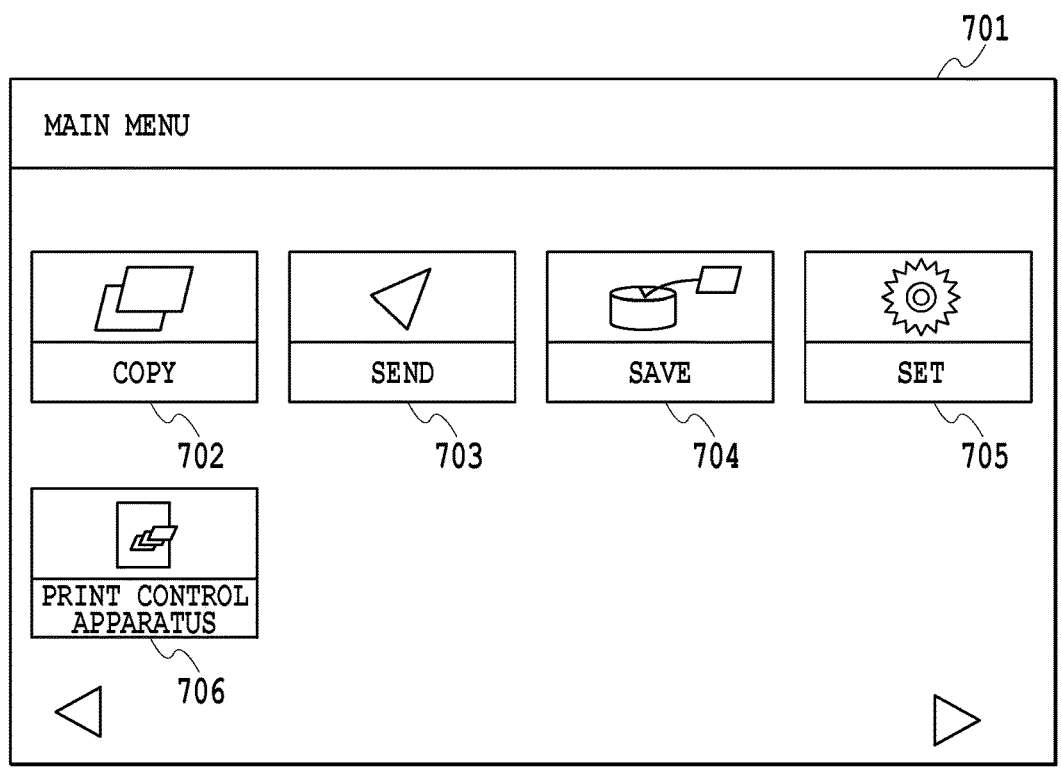
FIG. 7 is an explanatory diagram showing an example of a top screen that is displayed on an operation screen of the operation panel.

FIG. 7 is an explanatory diagram showing an example of a top screen 701 that is displayed on the operation screen 405 of the operation panel 401. A Copy button 702 provides a copy function. A Send button 703 provides a function to transmit image data acquired by the reader unit 303 reading a document to another computer device. A Save button 704 provides a function to save document data acquired by the reader unit 303 reading a document in the HDD 309 or the like. A Set button 705 provides a setting function to perform various settings of the image forming apparatus 207. A Print control apparatus button 706 is a shortcut button to start an application (hereinafter, referred to as browser application) for assessing the print control apparatus 201 by making use of a Web browser. By pressing down the Print control apparatus button 706, the browser application is started and the URL of the print control apparatus 201 registered in advance is accessed.

Figure 8A:
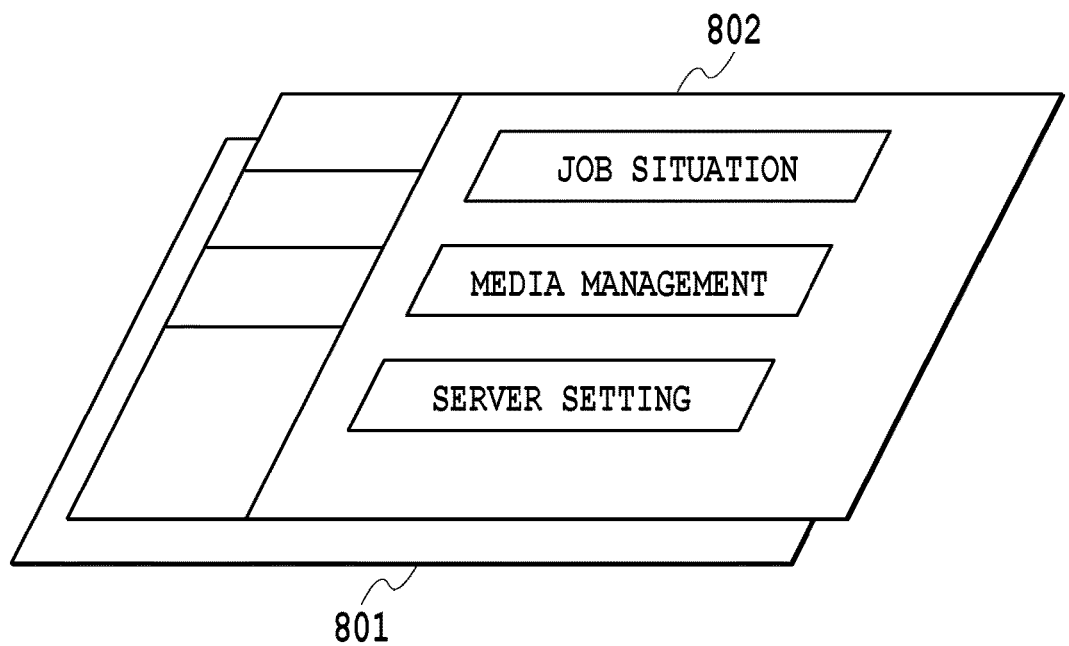
FIGS. 8A and 8B are schematic diagrams for explaining a screen of a Web browser that is displayed in the case where a Print control apparatus button is pressed down.
Figure 8B:
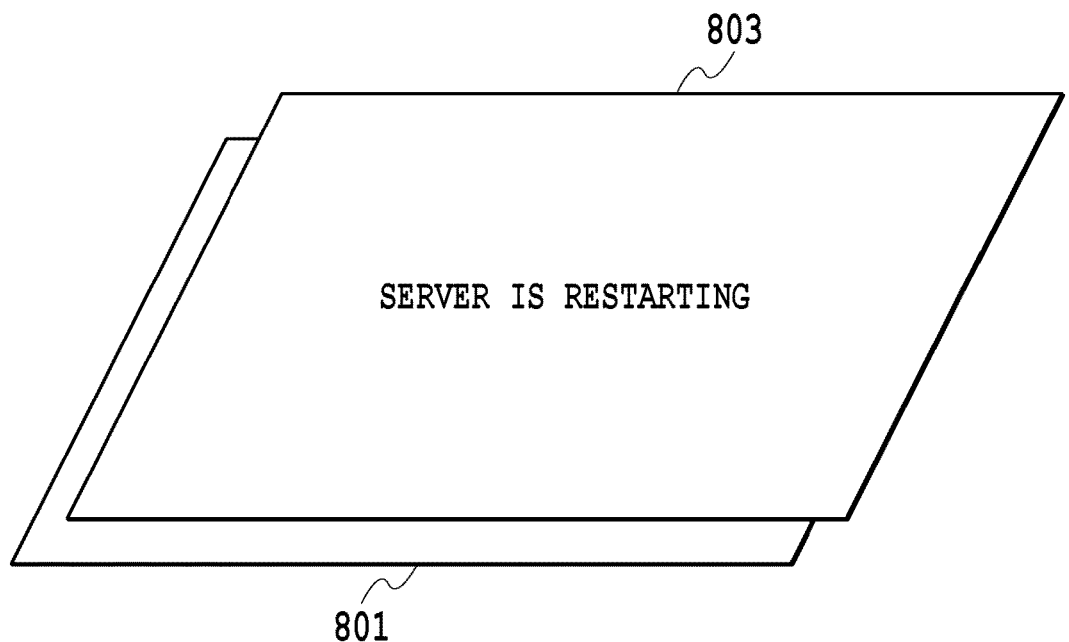

FIG. 8A and FIG. 8B are schematic diagrams for explaining the screen of the browser application which is displayed at the time of the Print control apparatus button 706 being pressed down.

As shown in FIG. 8A and FIG. 8B, the browser application displays a UI screen 802 and a text screen 803 on a display area 801 in an overlapping manner. The display area 801 is a display area of the browser application on the operation screen 405.

In the case where Web contents can be acquired from the Web server unit 605 of the print control apparatus 201, the Web browser display control unit 504 of the image forming apparatus 207 causes the browser application to operate as a Web browser. That is, the Web browser display control unit 504 overlaps the screen of the Web browser (specifically, the UI screen 802 made up of the acquired Web contents) over the display area 801 of the browser application as shown in FIG. 8A. In this manner, on the operation screen 405, the screen of the Web UI provided by the print control apparatus 201 is displayed.

In the case where Web contents cannot be acquired from the Web server unit 605 of the print control apparatus 201, the Web browser display control unit 504 of the image forming apparatus 207 causes the browser application to operate as a text viewer. That is, the Web browser display control unit 504 overlaps the text screen 803 indicating the condition of the print control apparatus 201 over the display area 801 of the browser application as shown in FIG. 8B. The contents of the text switch in accordance with the condition of the print control apparatus 201. In FIG. 8B, an example of the text that is displayed in the case where the print control apparatus 201 is restarted is shown. The text viewer and the text display are merely exemplary and for example, it may also be possible to display an image corresponding to the condition information acquired from the condition information transmission unit 606.

Figure 9:
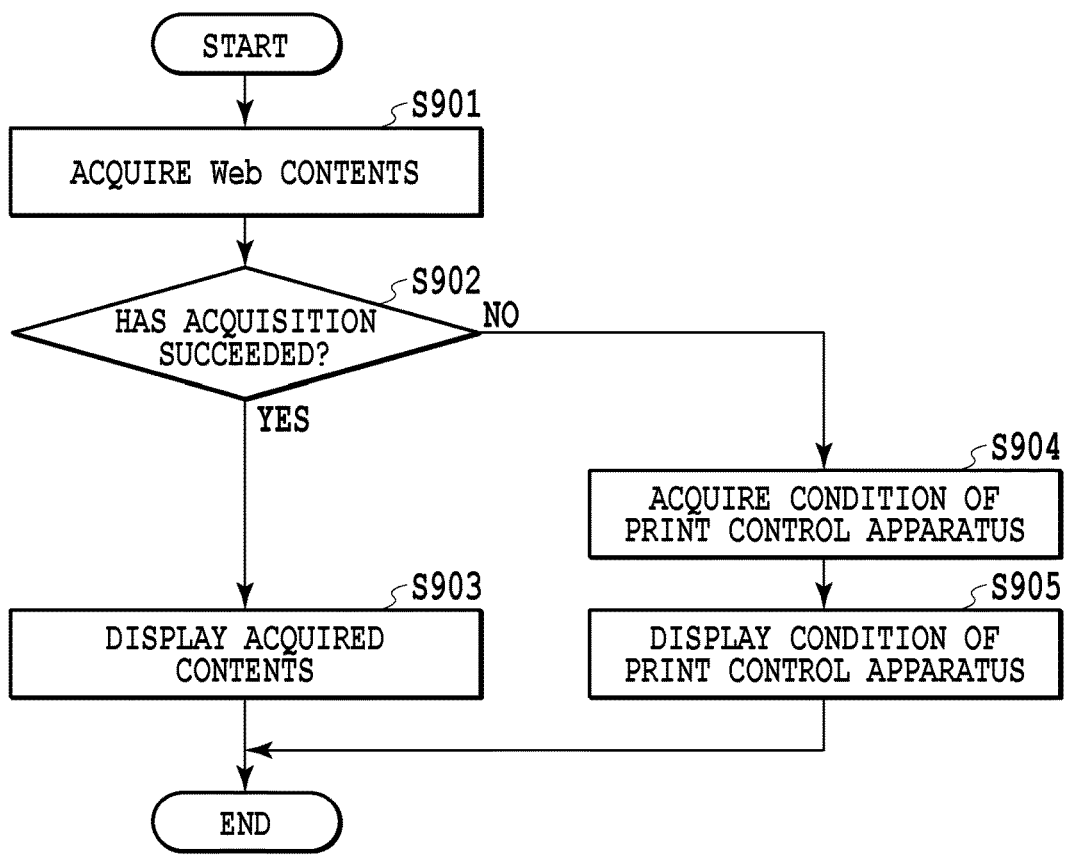
FIG. 9 is a flowchart showing an operation of the image forming apparatus according to the first embodiment.

FIG. 9 is a flowchart showing the operation of the image forming apparatus 207 according to the first embodiment. The flow shown in FIG. 9 starts by the Print control apparatus button 706 being pressed down. Each operation (step) shown in the flowchart in FIG. 9 is implemented by the CPU of the control unit 308 reading a control program for implementing each control module stored in the ROM onto the RAM and executing the program.

At step S901, the Web browser display control unit 504 acquires Web contents from the Web server unit 605 of the print control apparatus 201.

At step S902, the Web browser display control unit 504 determines whether acquisition of Web contents has succeeded at step S901. In the case of determining that acquisition of Web contents has succeeded (YES at step S902), the Web browser display control unit 504 proceeds to the processing at step S903. In the case of determining that acquisition of Web contents has failed (NO at step S902), the Web browser display control unit 504 proceeds to the processing at step S904.

At step S903, the Web browser display control unit 504 displays the Web contents acquired at step S901. That is, the Web browser display control unit 504 displays the UI screen as shown in FIG. 8A on the operation screen 405.

At step S904, the control apparatus condition information acquisition unit 505 acquires condition information indicating the condition of the print control apparatus 201 from the condition information transmission unit 606.

At step S905, the Web browser display control unit 504 produces a display in accordance with the condition information acquired from the condition information transmission unit 606 of the print control apparatus 201.

At step S904, for example, in the case where the print control apparatus 201 is in the restarting or the power-off condition, it is not possible for the control apparatus condition information acquisition unit 505 to acquire the condition information from the condition information transmission unit 606. In such a case, the Web browser display control unit 504 produces a display based on the condition information acquired most recently (e.g., the condition information indicating that a transition is made into the restating condition or the power-off condition) of the condition information acquired by the above-described monitoring processing of the control apparatus condition information acquisition unit 505. Due to this, for example, even in the case where the Print control apparatus button 706 is pressed down while the print control apparatus 201 is restarting, it is made possible for the Web browser display control unit 504 to display the text screen (the text screen 803 shown in FIG. 8B) indicating that the print control apparatus 201 is restarting at step S905.

As described above, the image forming apparatus according to the present embodiment acquires information indicating the condition of the print control apparatus from the condition information transmission unit 606 of the print control apparatus and displays the information on the operation screen in the case where Web contents cannot be acquired due to, for example, the termination of the connection with the Web server unit of the print control apparatus. As described above, according to the present embodiment, even in the case where Web contents cannot be acquired from the Web server (print control apparatus), it is made possible to notify a user of the condition of the Web server. Consequently, in the case where Web contents cannot be acquired from the Web server, it is made possible for a user not only to determine whether acquisition of Web contents has succeeded or failed but also to determine why Web contents cannot be acquired. Consequently, it is possible to determine when the Web UI will be restored or the like, and therefore, it is possible to increase user convenience.

Further, the image forming apparatus according to the present embodiment monitors the condition of the print control apparatus and holds the monitoring results. Furthermore, the print control apparatus according to the present embodiment notifies the image forming apparatus of the condition information not only in the case where there is a notification request from the image forming apparatus but also in the case where the condition of the print control apparatus has changed. Consequently, even in the case where the power source of the print control apparatus turns off or the print control apparatus restarts, it is possible for the image forming apparatus to notify a user of the condition of the print control apparatus based on the condition information acquired immediately therebefore.

Further, as described above, in Japanese Patent Laid-Open No. 2011-119939, in the case where it is not possible to correctly communicate with the Web server, the Web browser displays the alternative UI screen included inside the apparatus on the Web browser. On the other hand, the image forming apparatus according to the present embodiment notifies a user of the condition of the print control apparatus by using a text viewer or the like in the case where Web contents cannot be acquired. Consequently, it is made possible to securely notify a user of the condition of the print control apparatus.

Further, the browser application included in the image forming apparatus of the present embodiment operates also as a general-purpose Web browser that browses a Web page. A user starts the browser application and inputs a URL of the Web server different from that of the print control apparatus 201 in the URL input form (diagrammatic representation omitted) of the browser application. The browser application accesses the URL, acquires Web contents from the Web server, and displays the screen of the Web page acquired from the server on the display area 801. On the other hand, in the case where Web contents cannot be acquired from the Web server even by accessing the URL, the browser application displays an alternative UI screen included inside the apparatus. Consequently, in the case where Web contents cannot be acquired from the Web server different from the print control apparatus, it is possible to display an alternative UI screen included inside the apparatus as conventionally.

[Second Embodiment]

In the first embodiment, in the case where Web contents cannot be acquired from the print control apparatus 201, a user is notified of the condition of the print control apparatus 201. There is a case where it is made possible to access the print control apparatus 201 after a fixed time elapses, such as in the case where the print control apparatus 201 has restarted. That is, there is a case where it is made possible to acquire Web contents after a fixed time elapses. In such a case, a user retries to acquire Web contents by pressing down the Print control apparatus button 706 after a fixed time elapses. However, such an operation is troublesome to a user.

Consequently, in the second embodiment, in the case where the image forming apparatus 207 has failed to acquire Web contents due to the restart or the like of the print control apparatus 201, reacquisition of Web contents is performed after a fixed time elapses to simplify the user operation.

Figure 10:
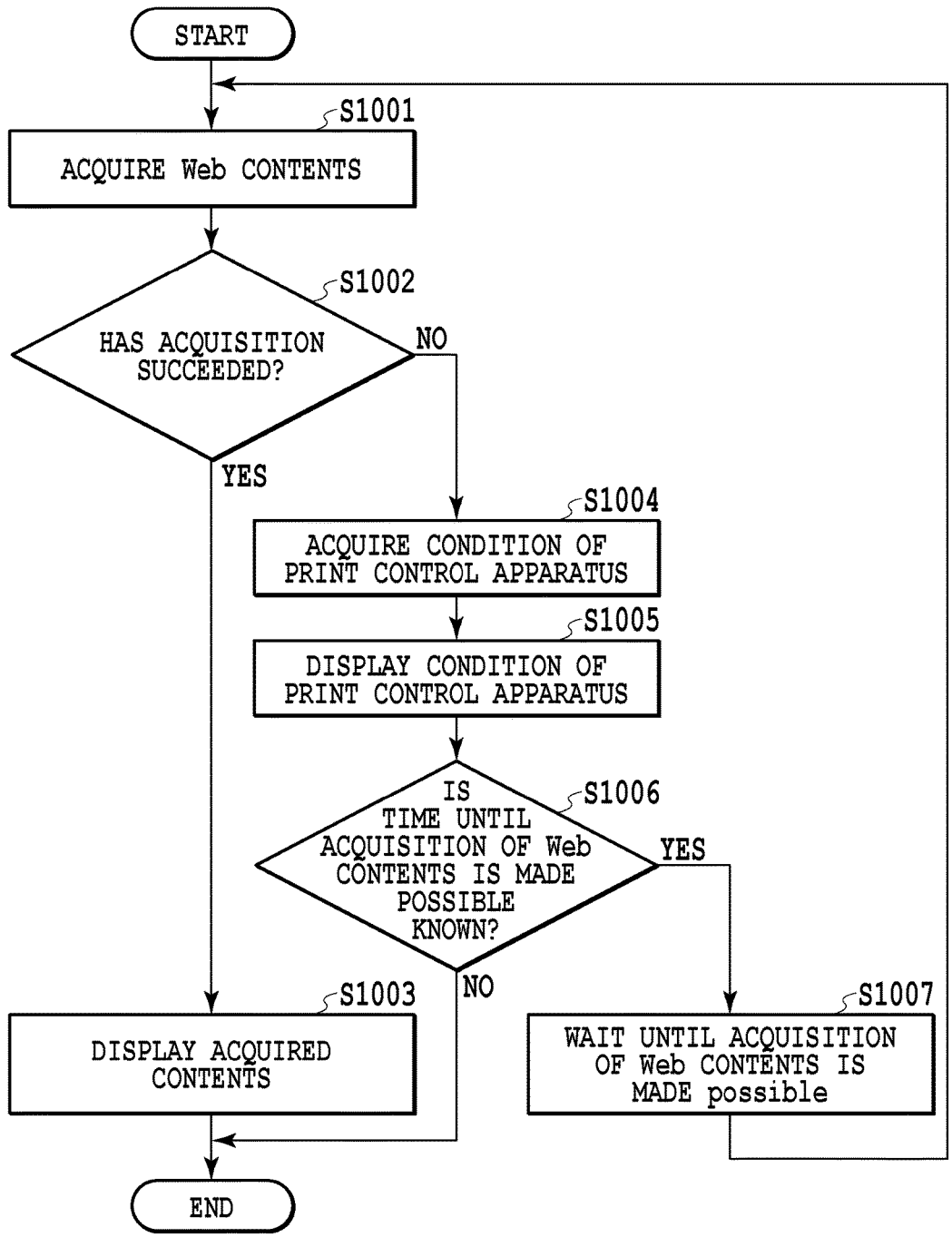
FIG. 10 is a flowchart according to a second embodiment.

FIG. 10 is a flowchart showing the operation of the image forming apparatus 207 according to the second embodiment. Each operation (step) shown in the flowchart in FIG. 10 is implemented by the CPU of the control unit 308 reading a control program for implementing each module stored in the ROM onto the RAM and executing the program.

The processing at step S1001 to step S1005 is the same as the processing at step S901 to step S905 of the first embodiment, and therefore, explanation is omitted.

At step S1006, whether or not the control apparatus condition information acquisition unit 505 is notified of the time (predicted time) until acquisition of Web contents is made possible. In the case where the control apparatus condition information acquisition unit 505 is not notified of the time until acquisition of Web contents is made possible (NO, at step S1006), the image forming apparatus 207 terminates the processing. In the case where the control apparatus condition information acquisition unit 505 is notified of the time until acquisition of Web contents is made possible (YES at step S1006), the image forming apparatus 207 proceeds to the processing at step S1007.

The condition information transmission unit 606 notifies the control apparatus condition information acquisition unit 505 of the time until acquisition of Web contents is made possible along with the notification of the condition information. Examples of the case where the control apparatus condition information acquisition unit 505 is notified of the time until acquisition of Web contents is made possible are a case where the print control apparatus 201 has been restarted, a case where the power is turned off, etc. It may also be possible for the control apparatus condition information acquisition unit 505 to acquire the time until acquisition of Web contents is made possible from the condition information transmission unit 606. For example, it may also be possible for the control apparatus condition information acquisition unit 505 to make a request for the time until acquisition of Web contents is made possible to the condition information transmission unit 606 in the case where the condition information acquired from the condition information transmission unit 606 indicates the restarting or starting condition.

For example, it may also be possible for the condition information transmission unit 606 to notify the control apparatus condition information acquisition unit 505 of the time until acquisition of Web contents is made possible based on the time necessary for the print control apparatus 201 to restart upon receipt of instructions to restart the print control apparatus 201 from a user. At this time, the condition information transmission unit 606 also notifies the control apparatus condition information acquisition unit 505 of the condition information indicating that the condition makes a transition into the restarting condition.

Further, for example, in the case where the condition information transmission unit 606 enters the operable condition earlier than the Web server unit 605 after the power of the print control apparatus 201 is turned on, it may also be possible to make such a notification as follows. That is, in the case where the power of the print control apparatus 201 is turned on and the communication between the condition information transmission unit 606 and the control apparatus condition information acquisition unit 505 of the image forming apparatus 207 is made possible, it may also be possible for the condition information transmission unit 606 to notify the control apparatus condition information acquisition unit 505 of the time until acquisition of Web contents is made possible based on the time until the Web server unit 605 becomes operable. At this time, the condition information transmission unit 606 also notifies the control apparatus condition information acquisition unit 505 of the condition information indicating the starting condition.

It may be possible for the print control apparatus 201 to hold in advance the time necessary for the print control apparatus 201 to restart and the time until the Web server unit 605 becomes operable in a storage unit (e.g., HDD 105).

At step S1007, the Web browser display control unit 504 waits until acquisition of Web contents is made possible. At this time, it may also be possible for the Web browser display control unit 504 to display information corresponding to the time until acquisition of Web contents is made possible on the text screen 803. For example, it may also be possible to display text information, such as "Now restarting. Wait about 30 seconds". Then, after the time until acquisition of Web contents is made possible elapses, the Web browser display control unit 504 returns to the processing at step S1001 and acquires Web contents. There is a possibility that the time until acquisition of Web contents is made possible has an error. Consequently, in the case where Web contents cannot be acquired by the processing at step S1001, which is performed again, it may also be possible for the Web browser display control unit 504 to perform palling for acquiring Web contents at fixed time intervals for the print control apparatus 201.

As described above, in the present embodiment, in the case where Web contents cannot be acquired and after a fixed time elapses, acquisition of Web contents is made possible, the image forming apparatus 207 reacquires Web contents after the fixed time elapses. Due to this, even in the case where acquisition of Web contents has failed during the period of time during which the power of the print control apparatus 201 is on or the print control apparatus 201 is restarting, it is made possible to display Web contents on the operation screen 405 without requiring a user operation after the fixed time elapses (specifically, after access to Web contents is enabled). Consequently, it is possible to further simplify the user operation and it is made possible to further improve user convenience.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in an apparatus employing a Web UI, even in the case where Web contents cannot be acquired from a Web server, it is possible to notify a user of the condition of the Web server.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-256752 filed Dec. 28, 2015, which is hereby incorporated by reference wherein in its entirety.

What is claimed is:

1. A printing apparatus capable of communicating with a print server, comprising:
  a memory device that stores a set of instructions; and
  at least one processor that executes the instructions to:
    transmit a first request for acquiring Web contents to the print server by using a first communication method, wherein the first communication method is a communication method that uses an HTTP protocol;
    display on a display unit, in a case where Web contents are received as a response to the first request, a screen based on the received Web contents;
    acquire, in a case where the Web contents cannot be acquired as a response to the first request, a condition of the print server from the print server by using a second communication method different from the first communication method, wherein the second communication method is a communication method that uses a communication protocol different from the HTTP protocol;
    generate display data indicating a condition of the print server based on the acquired condition;
    display on the display unit, in the case where the Web contents cannot be acquired as a response to the first request, a screen based on the generated display data without displaying a screen indicating an error of the first request transmitted using the HTTP protocol;
    transmit a second request for acquiring Web contents to a server different from the print server using the HTTP protocol; and display on the display unit, in a case where Web contents cannot be received as a response to the second request, a screen indicating an error of the second request transmitted using the HTTP protocol without displaying the screen based on the generated display data.

2. The printing apparatus according to claim 1, wherein the print server is a print control apparatus for expanding print data received from an external apparatus and inputting the print job to the printing apparatus.

3. The printing apparatus according to claim 2, wherein the printing apparatus and the print server are connected in a one-to-one manner by using a single wired cable.

4. The printing apparatus according to claim 1, wherein the condition of the print server includes any of a normal condition, a restarting condition, a power-off condition, a starting condition, and a print server function error condition.

5. The printing apparatus according to claim 1, further comprising:
a storage unit configured to store the condition acquired from the print server, wherein
the at least one processor further executes the instructions to:
acquire the condition stored in the storage unit as the condition of the print server in a case where the Web contents cannot be acquired from the print server by using the first communication method and the condition cannot be acquired by using the second communication method.

6. The printing apparatus according to claim 1, wherein the at least one processor further executes the instructions to:
transmit a request for a current condition to the print server at predetermined intervals and acquire the condition of the print server as a response to the request; and
store the acquired condition in a storage area.

7. An information system including at least a print server and a printing apparatus capable of communicating with the print server,
the print server comprising:
a storage unit that stores a setting value of the information processing apparatus;
a memory device that stores a set of instructions; and
at least one processor that executes the instructions to:
transmit Web contents corresponding to a first request for acquiring Web contents in response to transmission of the first request from the printing apparatus to the print server by using a first communication method, wherein the first communication method is a communication method that uses a HTTP protocol; and
transmit a condition of the print server to the printing apparatus by using a second communication method different from the first communication method, wherein the second communication method is a communication method that uses a communication protocol different from the HTTP protocol; and
the printing apparatus comprising:
a memory device that stores a set of instructions; and
at least one processor that executes the instructions to:
transmit the first request for acquiring Web contents to the print server by using the first communication method;

display on a display unit, in a case where Web contents are received from the print server as a response to the first request, a screen based on the received Web contents;
acquire, in a case where the Web contents cannot be acquired as a response to the first request, the condition of the print server from the print server by using the second communication method different from the first communication method;
generate display data indicating a condition of the print server based on the acquired condition;
display on the display unit, in the case where the Web contents cannot be acquired as a response to the first request, a screen based on the generated display data without displaying a screen indicating an error of the first request transmitted using the HTTP protocol;
transmit a second request for acquiring Web contents to a server different from the print server using the HTTP protocol; and
display on the display unit, in a case where Web contents cannot be received as a response to the second request, a screen indicating an error of the second request transmitted using the HTTP protocol without displaying the screen based on the generated display data.

8. The information system according to claim 7, wherein the at least one processor in the print server further executes the functions to:
transmit a condition indicating a predicted time until acquisition of the Web contents is made possible along with a condition indicating a restarting condition as the condition of the print server based on the print server having received restart instructions from a user.

9. The information system according to claim 8, wherein the at least one processor in the printing apparatus further executes the instructions to:
request the Web contents again based on a predicted time after displaying a screen based on the condition of the server on the display unit in a case where the predicted time until acquisition of the Web contents is made possible is included in the condition acquired from the print server.

10. The information system according to claim 7, wherein the printing apparatus and the print server are connected in a one-to-one manner by using a wired cable.

11. An information processing method performed by cooperation of at least one processor and a memory of a printing apparatus capable of communicating with a print server, the method comprising:
transmitting a first request for acquiring Web contents to the print server by using a first communication method, wherein the first communication method is a communication method that uses a HTTP protocol;
displaying on a display unit, in a case where Web contents are received as a response to the first request, a screen based on the received Web contents;
acquiring, in a case where the Web contents cannot be acquired as a response to the first request, a condition of the print server from the print server by using a second communication method different from the first communication method, wherein the second communication method is a communication method that uses a communication protocol different from the HTTP protocol;

generating display data indicating a condition of the print server based on the acquired condition;

displaying on the display unit, in the case where the Web contents cannot be acquired as a response to the first request, a screen based on the generated display data without displaying a screen indicating an error of the first request transmitted using the HTTP protocol;

transmitting a second request for acquiring Web contents to a server different from the print server using the HTTP protocol; and displaying on the display unit, in a case where the Web contents cannot be received as a response to the second request, a screen indicating an error of the second request transmitted using the HTTP protocol without displaying the screen based on the generated display data.

12. A non-transitory computer readable storage medium storing a program for causing a computer to perform an information processing method in a printing apparatus capable of communicating with a print server, the method comprising:

transmitting a first request for acquiring Web contents to the print server by using a first communication method, wherein the first communication method is a communication method that uses a HTTP protocol;

displaying on a display unit, in a case where Web contents are received as a response to the first request, a screen based on the received Web contents;

acquiring, in a case where the Web contents cannot be acquired as a response to the first request, a condition of the print server from the print server by using a second communication method different from the first communication method, wherein the second communication method is a communication method that uses a communication protocol different from the HTTP protocol;

generating display data indicating a condition of the print server based on the acquired condition;

displaying on the display unit, in the case where the Web contents cannot be acquired as a response to the first request, a screen based on the generated display data without displaying a screen indicating an error of the first request transmitted using the HTTP protocol;

transmitting a second request for acquiring Web contents to a server different from the print server using the HTTP protocol; and displaying on the display unit, in a case where the Web contents cannot be received as a response to the second request, a screen indicating an error of the second request transmitted using the HTTP protocol without displaying the screen based on the generated display data.

* * * * *